US008556658B2

(12) United States Patent
Szczesny et al.

(10) Patent No.: US 8,556,658 B2
(45) Date of Patent: Oct. 15, 2013

(54) RECEPTACLE ASSEMBLY FOR A PLUGGABLE MODULE

(75) Inventors: David Szczesny, Hershey, PA (US); Michael Eugene Shirk, Grantvill, PA (US); Michael J. Phillips, Camp Hill, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 49 days.

(21) Appl. No.: 13/197,627

(22) Filed: Aug. 3, 2011

(65) Prior Publication Data

US 2013/0034999 A1 Feb. 7, 2013

(51) Int. Cl.
*H01R 13/648* (2006.01)
(52) U.S. Cl.
USPC ........................................ 439/607.2; 361/704
(58) Field of Classification Search
USPC .......... 439/76.1, 79, 607.2, 607.21, 637, 638, 439/660; 361/704, 715; 385/53, 88, 92
See application file for complete search history.

(56) References Cited

U.S. PATENT DOCUMENTS

| | | | |
|---|---|---|---|
| 6,816,376 B2 * | 11/2004 | Bright et al. | 361/704 |
| 6,980,437 B2 | 12/2005 | Bright | |
| 7,001,217 B2 | 2/2006 | Bright et al. | |
| 7,438,596 B2 | 10/2008 | Phillips | |
| 7,539,018 B2 | 5/2009 | Murr et al. | |
| 7,625,223 B1 | 12/2009 | Fogg | |
| 7,764,504 B2 * | 7/2010 | Phillips et al. | 361/715 |
| 7,794,241 B2 * | 9/2010 | Bright et al. | 439/79 |
| 8,081,470 B2 * | 12/2011 | Oki et al. | 361/715 |
| 2004/0033027 A1 * | 2/2004 | Pang et al. | 385/53 |

* cited by examiner

*Primary Examiner* — Thanh Tam Le (57) ABSTRACT

A receptacle assembly is provided for a pluggable module. The receptacle assembly includes a cage having an internal compartment and a front end that is open to the internal compartment. The internal compartment is configured to receive the pluggable module therein through the front end. The cage includes an alignment spring extending into the internal compartment. An electrical connector is positioned within the internal compartment of the cage. The electrical connector is configured to mate with the pluggable module to electrically connect the electrical connector to the pluggable module. The alignment spring of the cage is configured to engage the pluggable module as the pluggable module is received within the internal compartment of the cage such that the alignment spring biases the pluggable module in an alignment direction as the pluggable module is received within the internal compartment.

17 Claims, 9 Drawing Sheets

FIG. 9

RECEPTACLE ASSEMBLY FOR A PLUGGABLE MODULE

BACKGROUND OF THE INVENTION

The subject matter described and/or illustrated herein relates generally to receptacle assemblies, and more particularly to receptacle assemblies for pluggable modules.

Various types of fiber optic and copper based transceiver assemblies that permit communication between host equipment and external devices are known. These transceiver assemblies typically include a pluggable module that is received within a receptacle assembly, which includes a receptacle connector that pluggably connects to the pluggable module. The pluggable modules are constructed according to various standards for size and compatibility, for example the Quad Small Form-factor Pluggable (QSFP) module standard and the XFP standard.

The receptacle connectors of transceiver assemblies include a receptacle for pluggably connecting to the pluggable module. The receptacle receives a plug of the pluggable module therein. The plug may be the edge of a circuit board of the pluggable module or may be an extension of a straddle mount connector that is mounted to the edge of the circuit board of the pluggable module. As the plug of the circuit board is received within the receptacle, electrical contacts of the receptacle connector mate with electrical contacts of the plug to establish an electrical connection between the pluggable module and the receptacle connector.

As electrical and optical devices become smaller and the rate at which data signals propagate therethrough increases, electrical contacts of such devices become more densely grouped. For example, the distances between the centerlines of adjacent electrical contacts of the receptacle connector and between adjacent electrical contacts of the plug are becoming smaller and smaller to accommodate the smaller sizes and/or higher data rates. In some circumstances, the distances between the centerlines of adjacent electrical contacts has become small enough that tolerances of the contacts may combine, or buildup, to the extent that the contacts of the receptacle connector are misaligned with the corresponding contacts of the plug. Misalignment of the corresponding electrical contacts of the plug and the receptacle connector may cause an inadequate or no electrical connection therebetween. For example, when misaligned, the electrical contacts of the receptacle connector may engage dielectric material that extends between adjacent electrical contacts of the plug, and/or vice versa. Moreover, misalignment of the electrical contacts of the plug relative to the corresponding electrical contacts of the plug may cause the contacts of the receptacle connector to mate with the wrong contacts of the plug, for example which may result in an electrical short.

Misalignment of the electrical contacts of the receptacle connector and the corresponding electrical contacts of the plug can also be caused by sideways movement of the plug within the receptacle. For example, the receptacle may be provided with a greater length than the plug to facilitate insertion of the plug within the receptacle. More specifically, if the receptacle and the plug have the same length or the plug is longer than the receptacle, interference between the plug and ends of the receptacle may make it difficult to insert the plug into the receptacle. Accordingly, the plug may move, or float, sideways within the receptacle. The amount of sideways movement of the plug within the receptacle can be large enough to misalign the electrical contacts of the plug relative to the corresponding electrical contacts of the receptacle connector.

BRIEF DESCRIPTION OF THE INVENTION

In one embodiment, a receptacle assembly is provided for a pluggable module. The receptacle assembly includes a cage having an internal compartment and a front end that is open to the internal compartment. The internal compartment is configured to receive the pluggable module therein through the front end. The cage includes an alignment spring extending into the internal compartment. An electrical connector is positioned within the internal compartment of the cage. The electrical connector is configured to mate with the pluggable module to electrically connect the electrical connector to the pluggable module. The alignment spring of the cage is configured to engage the pluggable module as the pluggable module is received within the internal compartment of the cage such that the alignment spring biases the pluggable module in an alignment direction as the pluggable module is received within the internal compartment.

In another embodiment, a transceiver assembly includes a pluggable module, and a receptacle assembly. The receptacle assembly includes a cage having an internal compartment and a front end that is open to the internal compartment. The internal compartment is configured to receive the pluggable module therein through the front end. The cage includes an alignment spring extending into the internal compartment. An electrical connector is positioned within the internal compartment of the cage. The electrical connector is configured to mate with the pluggable module to electrically connect the electrical connector to the pluggable module. The alignment spring of the cage is configured to engage the pluggable module as the pluggable module is received within the internal compartment of the cage such that the alignment spring biases the pluggable module in an alignment direction as the pluggable module is received within the internal compartment.

DETAILED DESCRIPTION OF THE INVENTION

Figure 1:
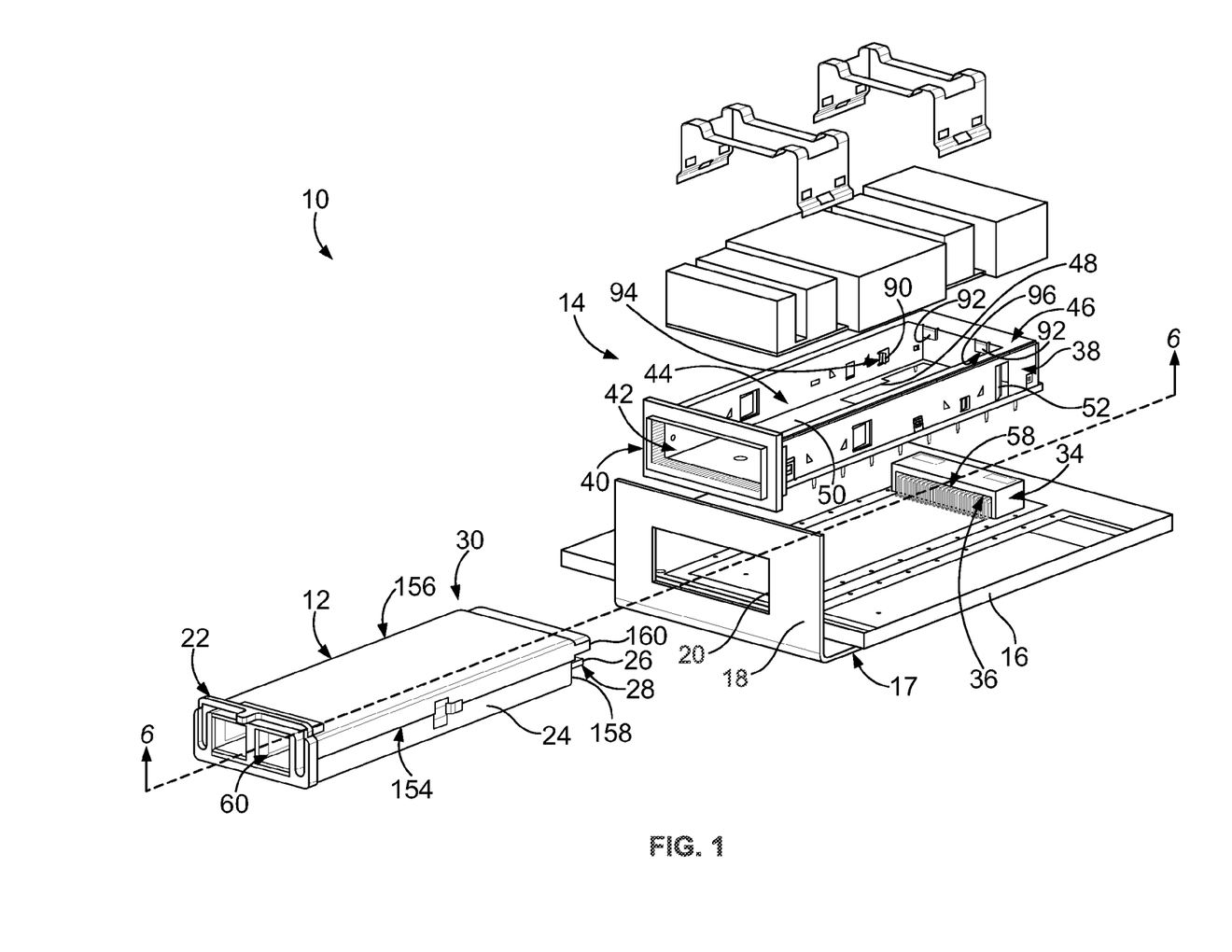
FIG. 1 is an exploded perspective view of an exemplary embodiment of a transceiver assembly.

FIG. 1 is a perspective view of a portion of an exemplary embodiment of a transceiver assembly 10. In the exemplary embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 28 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or any exemplary type of transceiver assembly shown and/or described herein.

The transceiver assembly 10 includes a pluggable module 12 configured for pluggable insertion into a receptacle assembly 14 that is mounted on a host circuit board 16. The host circuit board 16 may be mounted in a host system (not shown) such as, but not limited to, a router, a server, a computer, and/or the like. The host system typically includes a conductive chassis 17 having a panel 18 including an opening 20 extending therethrough in substantial alignment with the receptacle assembly 14. The receptacle assembly 14 is optionally electrically connected to the panel 18.

The pluggable module 12 is configured to be inserted into the receptacle assembly 14. Specifically, the pluggable module 12 is inserted into the receptacle assembly 14 through the panel opening 20 such that a front end 22 of the pluggable module 12 extends outwardly from the receptacle assembly 14. The pluggable module 12 includes a housing 24 that forms a protective shell for a circuit board 26 that is disposed within the housing 24. The circuit board 26 carries circuitry, traces, paths, devices, and/or the like that perform transceiver functions in a known manner. An edge 28 of the circuit board 26 is exposed at a rear end 30 of the housing 24. In an exemplary embodiment, a straddle mount connector 32 (FIG. 2) is mounted to the circuit board 26 and exposed through the rear end 30 of the housing 24 for plugging into a receptacle connector 34 of the receptacle assembly 14. The connector 32 is not shown in FIG. 1. In alternative to the connector 32, the circuit board 26 of the pluggable module 12 may directly mate with the receptacle connector 34. In other words, in some alternative embodiments, the edge 28 of the circuit board 26 of the pluggable module 12 is received within a receptacle 36 of the receptacle connector 34 to electrically connect the pluggable module 12 to the receptacle connector 34.

In general, the pluggable module 12 and the receptacle assembly 14 may be used in any application requiring an interface between a host system and electrical and/or optical signals. The pluggable module 12 interfaces to the host system through the receptacle assembly 14 via the receptacle connector 34 of the receptacle assembly 14, which is located within an electrically conductive cage 38 (which is sometimes referred to as a "receptacle guide frame" or a "guide frame"). As illustrated in FIG. 1, the cage 38 includes a front end 40 having a front opening, or port, 42 that is open to an internal compartment 44 of the cage 38. The receptacle connector 34 is positioned within the internal compartment 44 at a rear end 46 of the cage 38. The cage 38 includes an opening 48 extending through a lower wall 50 of the cage 38 for enabling the receptacle connector 34 to electrically connect to the host circuit board 16 from within the internal compartment 44. The internal compartment 44 of the cage 38 is configured to receive the pluggable module 12 therein in electrical connection with the receptacle connector 34.

The cage 38 includes an alignment spring 52 that extends into the internal compartment 44. As will be described in more detail below, the alignment spring 52 engages the pluggable module 12 as the pluggable module 12 is received within the internal compartment 44 of the cage 38 to align electrical contacts 54 (FIGS. 2, 4, and 8-10) of a plug 56 (FIGS. 2, 4, and 6-10) of the pluggable module 12 with corresponding electrical contacts 58 of the receptacle connector 34.

The pluggable module 12 interfaces to one or more optical cables (not shown) and/or one or more electrical cables (not shown) through a connector interface 60 at the front end 22 of the module 12. Optionally, the connector interface 60 comprises a mechanism that cooperates with a fiber or cable assembly (not shown) to secure the fiber or cable assembly to the pluggable module 12. Suitable connector interfaces 60 are known and include adapters for the LC style fiber connectors and the MTP/MPO style fiber connectors offered by Tyco Electronics Corporation (Harrisburg, Pa.).

Figure 2:
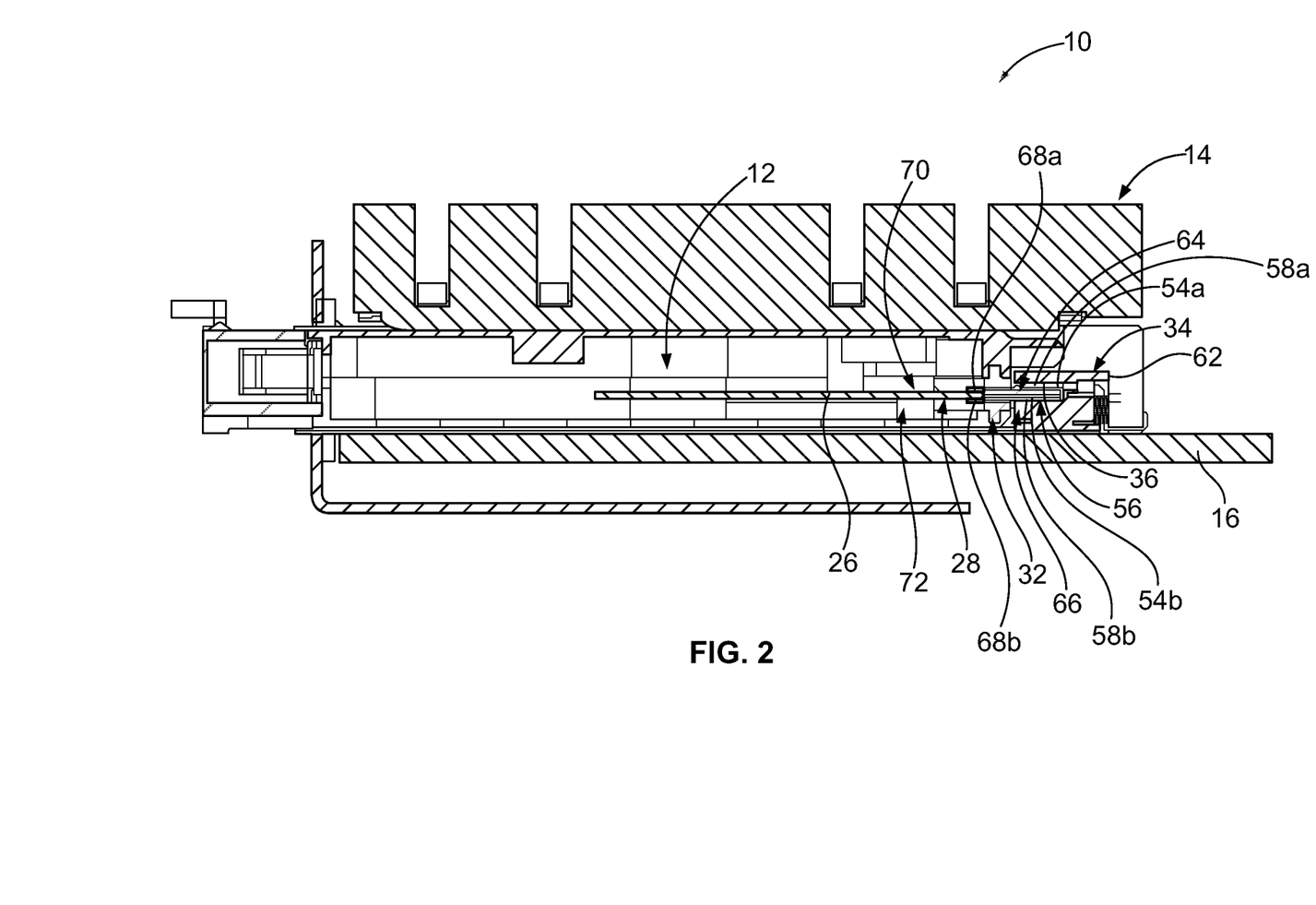
FIG. 2 is a cross-sectional view of the transceiver assembly shown in FIG. 1 illustrating an exemplary embodiment of a pluggable module mated with an exemplary embodiment of a receptacle assembly.

FIG. 2 is a cross-sectional view of the transceiver assembly 10 illustrating the pluggable module 12 mated with the receptacle assembly 14. The receptacle connector 34 is mounted on the host circuit board 16. The receptacle connector 34 includes a dielectric connector body 62 having the receptacle 36. Optionally, the straddle mount connector 32 is mounted to the edge 28 of the circuit board 26 in electrical connection therewith.

The receptacle 36 of the receptacle connector 34 receives the plug 56 of the straddle mount connector 32 therein. Electrical contacts 58a of the receptacle connector 34 extend within the receptacle 36 and engage corresponding electrical contacts 54a on a side 64 of the plug 56. Electrical contacts 58b of the receptacle connector 34 extend within the receptacle 36 and engage corresponding electrical contacts 54b on a side 66 of the plug 56 that is opposite the side 64. The electrical contacts 54a and 54b of the plug 56 are electrically connected to corresponding electrically conductive contact pads 68a and 68b, respectively, on opposite sides 70 and 72 of the circuit board 26 to establish an electrical connection between the circuit board 26 and the host circuit board 16.

Figure 3:
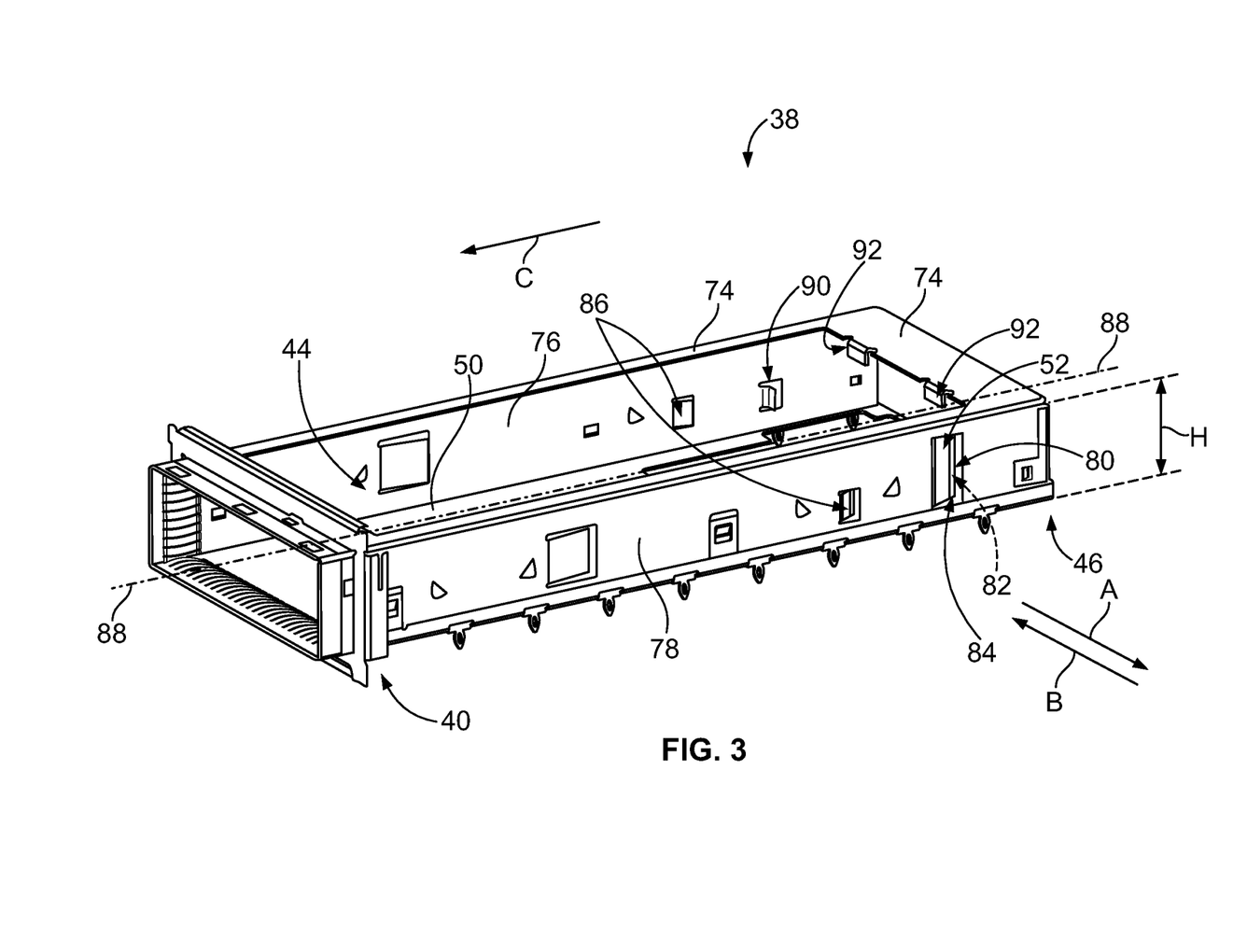
FIG. 3 is a perspective view of a portion of an exemplary embodiment of a cage of the transceiver assembly shown in FIGS. 1 and 2.

FIG. 3 is a perspective view of the cage 38. The cage 38 extends a length from the front end 40 to the rear end 46 along a central longitudinal axis 88. The cage 38 includes an upper wall 74, the lower wall 50, and side walls 76 and 78 that extend from the upper wall 74 to the lower wall 50. The internal compartment 44 of the cage 38 extends between the walls 74, 50, 76, and 78.

The cage 38 includes the alignment spring 52. In an exemplary embodiment, the alignment spring 52 extends from the side wall 78. The alignment spring 52 extends a length outwardly from the side wall 78 to an end 80 of the spring 52. The end 80 includes a module interface 82 at which the alignment spring 52 engages the pluggable module 12 (FIGS. 1, 2, 4, and 6-8). The module interface 82 is better seen in FIG. 7. The end 80 of the alignment spring 52 optionally includes a curved and/or angled segment 84, which optionally includes the module interface 82. In some alternative embodiments, the module interface 82 is located along a different segment of the length of the alignment spring 52 than the end 80. As can be seen in FIG. 3, the alignment spring 52 extends along a majority of a height H of the side wall 78. For example, in an exemplary embodiment, the alignment spring 52 extends along at least 75% of the height H of the wall 78. But, the alignment spring 52 may extend along any amount of the height H of the wall 78.

FIG. 3 illustrates the natural resting position of the alignment spring 52. The alignment spring 52 is resiliently deflectable from the natural resting position in the direction of the arrow A in FIG. 3. When deflected from the natural resting position, the alignment spring 52 exerts a biasing force that acts in a direction B that is generally opposite the direction A. As will be described in more detail below, the alignment spring 52 is configured to exert the biasing force on the pluggable module 12 as the pluggable module 12 is received within the internal compartment 44 of the cage 38.

In an exemplary embodiment, the alignment spring 52 extends outwardly from the side wall 78 at a non-parallel angle relative to the side wall 78 of less than approximately 45°. But, the alignment spring 52 may extend outwardly from the side wall 78 at any other non-parallel angle relative to the side wall 78. The angle of the alignment spring 52 relative to the side wall 78 may be selected to provide the alignment spring 52 with a predetermined biasing force. Although shown and described herein as extending outwardly from the side wall 78, the alignment spring 52 may alternatively extend outwardly from the side wall 76. Moreover, in some alternative embodiments, the cage 38 includes both an alignment spring 52 extending outwardly from the side wall 76 and an alignment spring 52 extending outwardly from the side wall 78. Each side wall 76 and 78 may include any number of the alignment springs 52, while the cage 38 may include any overall number of alignments springs 52. Although formed from a cutout of the side wall 78 in an exemplary embodiment, the alignment spring 52 may alternatively be fabricated separately from the side wall 78 and thereafter attached thereto.

Optionally, the cage 38 includes one or more centering springs 86 that extend into the internal compartment 44. In an exemplary embodiment, the cage 38 includes a centering spring 86 that extends outwardly from the side wall 76 into the internal compartment 44 and a centering spring 86 that extends outwardly from the side wall 78 into the internal compartment 44.

The centering springs 86 are resiliently deflectable from natural resting positions thereof via engagement with the housing 24 (FIGS. 1, 6, and 7) of the pluggable module 12. When deflected from the natural resting position, each centering spring 86 exerts a biasing force that acts in a direction generally toward the central longitudinal axis 88 of the cage 38. As will be described in more detail below, the biasing forces exerted on the pluggable module 12 by the centering springs 86 facilitates centering (relative to the axis 88) the pluggable module 12 within the internal compartment 44 of the cage 38.

Each centering spring 86 may extend outwardly from the corresponding side wall 76 or 78 at any angle relative thereto, which may be selected to provide the centering spring 86 with a predetermined biasing force. Each side wall 76 and 78 may include any number of the centering springs 86. The cage 38 may include any overall number of centering springs 86. Although formed from cutouts of the side walls 76 and 78 in an exemplary embodiment, the centering springs 86 may alternatively be fabricated separately from the corresponding side wall 76 or 78 and thereafter attached thereto.

The cage 38 optionally includes one or more stops 90 that extend into the internal compartment 44 and/or one or more stops 92 that extend into the internal compartment 44. The stop 90 and the stops 92 include front sides 94 and 96, respectively, that face generally toward the front end 40 of the cage 38. More specifically, the front sides 94 and 96 face generally in the direction of the arrow C in FIG. 3. As will be described below, the stop 90 and the stops 92 facilitate limiting the amount of travel of the pluggable module 12 along the length of the cage 38. The stop 90 may also facilitate preventing damage to the receptacle connector 34 (FIGS. 1, 2, and 5-10) if the pluggable module 12 is inserted into the internal compartment 44 in a upside down orientation.

In an exemplary embodiment, the cage 38 includes one stop 90 overall and two stops 92 overall. But, the cage 38 may include any overall number of the stops 90 and any overall number of the stops 92. Moreover, in an exemplary embodiment, the side wall 76 includes a stop 90, while the stops 92 extend into the internal compartment 44 from the upper wall 74. However, each wall 74, 50, 76 and 78 may include any number of the stops 90 and/or any number of the stops 92.

Although the cage 38 is shown as including only one internal compartment 44 and only one port 42 for electrically connecting one pluggable module 12 to the host circuit board 16, the cage 38 may include any number of internal compartments 44 and ports 42, arranged in any pattern, configuration, arrangement, and/or the like (such as, but not limited to, any number of rows and/or columns), for electrically connecting any number of pluggable modules 12 to the host circuit board 16. In an exemplary embodiment, the cage 38 includes a generally rectangular cross-sectional shape, defined by the walls 74, 50, 76, and 78, such that the cage 38 generally has the shape of a parallelepiped. But, the cage 38 may include any other shape.

Figure 4:
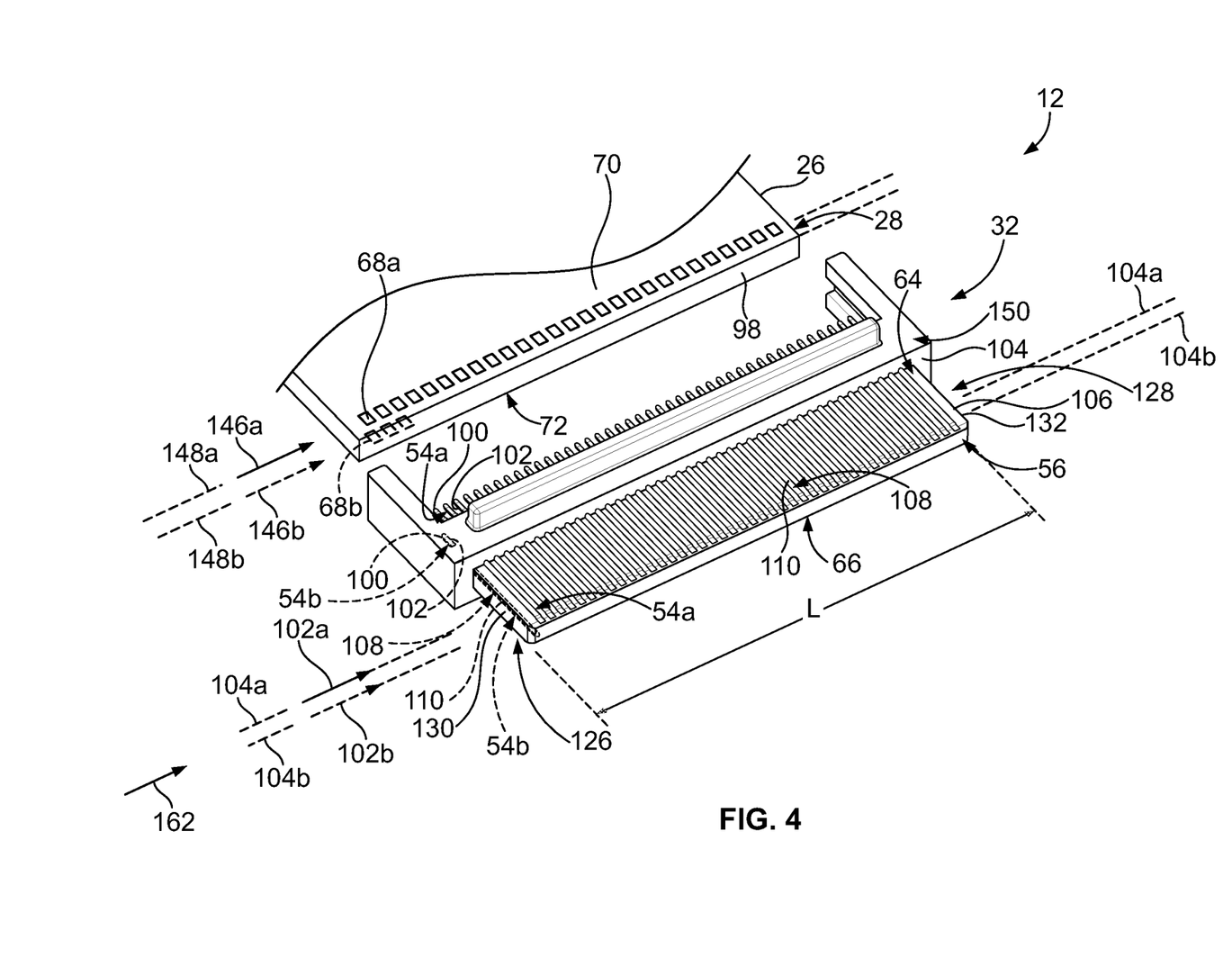
FIG. 4 is an exploded view of a portion of the pluggable module shown in FIG. 2 illustrating an exemplary embodiment of a circuit board and an exemplary embodiment of a straddle mount connector for mounting to the circuit board.

FIG. 4 is an exploded view of a portion of the pluggable module 12 illustrating the circuit board 26 and the straddle mount connector 32. The circuit board 26 includes the opposite sides 70 and 72 and the edge 28. The edge 28 includes an edge surface 98 and portions of the sides 70 and 72 that extend proximate the edge surface 98. The contact pads 68*a* are arranged on the side 70 of the circuit board 26 along the edge 28. The contact pads 68*b* are arranged on the side 72 along the edge 28. The contact pads 68*a* and 68*b* are arranged in respective rows 146*a* and 146*b* that extend lengths along the edge 28 of the circuit board 26. The rows 146*a* and 146*b* extend the lengths along respective row axes 148*a* and 148*b*. Optionally, the contact pads 68*a* and 68*b* are arranged such that one or more contact pads 68*a* on the side 70 of the circuit board 26 is aligned with a corresponding contact pad 68*b* on the side 72 of the circuit board 26. The contact pads 68*b* are indicated with phantom lines in FIG. 4. Only some of the contact pads 68*b* in the row 146*b* are shown in FIG. 4 for clarity. The contact pads 68*a* and 68*b* may be referred to herein as "mating contacts" and/or "contacts".

The circuit board 26 may include any number of the contact pads 68*a* and any number of the contact pads 68*b*. Each of the contact pads 68*a* and 68*b* may be a signal contact pad that is configured to conduct electrical data signals, a ground contact pad that is configured to be electrically connected to a ground, or a power contact that is configured to conduct electrical power. Optionally, some or all contact pads 68*a* and/or 68*b* used as signal contact pads may be arranged in pairs with each signal contact pad within a pair conveying a differential signal, thus defining one or more differential pairs. Within the arrangement of the contact pads 68*a* and 68*b*, one or more ground contact pads may be provided between adjacent differential pairs of signal contact pads. Any other contact arrangement of the contact pads 68*a* and 68*b* may be provided.

The straddle mount connector 32 is configured to be mounted to the edge 28 of the circuit board 26. The electrical contacts 54a and 54b of the straddle mount connector 32 include mounting segments 100 having mounting interfaces 102 that engage corresponding ones of the contact pads 68a or 68b on the corresponding side 70 or 72, respectively, of the circuit board 26. The mounting segments 100 of the electrical contacts 54a and 54b straddle the edge 28 of the circuit board 26 therebetween. Optionally, the mounting interfaces 102 are soldered to the corresponding contact pads 68a and 68b. Other mounting means are possible in alternative embodiments.

The straddle mount connector 32 includes a dielectric connector body 150 having a base 104 and an extension 106 that extends outwardly from the base 104. In an exemplary embodiment, the extension 106 defines the plug 56 of the pluggable module 12. But, in some alternative embodiments, the edge 28 of the circuit board 26 defines the plug 56 of the pluggable module 12, such that the receptacle 36 receives the edge 28 of the circuit board 26 therein and the contact pads 68a and 68b of the circuit board 26 engage corresponding electrical contacts 58a and 58b (FIGS. 1, 2, 5, 6, and 8-10), respectively, of the receptacle connector 34 (FIGS. 1, 2, and 5-10) to electrically connect the pluggable module 12 to the receptacle connector 34.

The plug 56 extends a length L from an end 126 to an opposite end 128. The ends 126 and 128 include respective end surfaces 130 and 132. As described above, the plug 56 is configured to be received within the receptacle 36 (FIGS. 1, 2, and 5-10) of the receptacle connector 34. The plug 56 includes the opposite sides 64 and 66. The ends 126 and 128 may each be referred to as a "plug end".

The electrical contacts 54a and 54b of the straddle mount connector 32 are held by the connector body 150. The electrical contacts 54a and 54b may include signal contacts that are configured to conduct electrical data signals, ground contacts that are configured to be electrically connected to a ground, and/or power contacts that are configured to conduct electrical power. The straddle mount connector 32 may include any number of the electrical contacts 54a and any number of the electrical contacts 54b. Optionally, some or all electrical contacts 54a and/or 54b used as signal contacts may be arranged in pairs with each signal contact within a pair conveying a differential signal, thus defining one or more differential pairs. Within the arrangement of the electrical contacts 54a and 54b, one or more ground contacts may be provided between adjacent differential pairs of signal contacts. Any other contact arrangement of the electrical contacts 54a and 54b may be provided. The electrical contacts 54a and 54b may be referred to herein as "mating contacts" and/or "contacts".

The electrical contacts 54a and 54b of the straddle mount connector 32 include mating segments 108 having mating interfaces 110 at which the electrical contacts 54a and 54b engage the corresponding electrical contacts 58a and 58b (FIGS. 1, 2, 5, 6, and 8-10), respectively, of the receptacle connector 34. Engagement between the mating interfaces 110 of the electrical contacts 54a and 54b and the corresponding electrical contacts 58a and 58b, respectively, establishes an electrical connection between the connectors 32 and 34. The mating segments 108 of the electrical contacts 54a and 54b are arranged in respective rows 102a and 102b that extend lengths along the sides 64 and 66, respectively, of the plug 56. The rows 102a and 102b extend the lengths along respective row axes 104a and 104b. The electrical contacts 54b are indicated with phantom lines in FIG. 4. Only some of the electrical contacts 54b in the row 102b are shown in FIG. 4 for clarity. Optionally, the electrical contacts 54a and 54b are arranged such that the mating segment 108 of one or more electrical contacts 54a on the side 66 of the plug 56 is aligned with the mating segment 108 of a corresponding electrical contact 54b on the side 66 of the plug 56.

Figure 5:
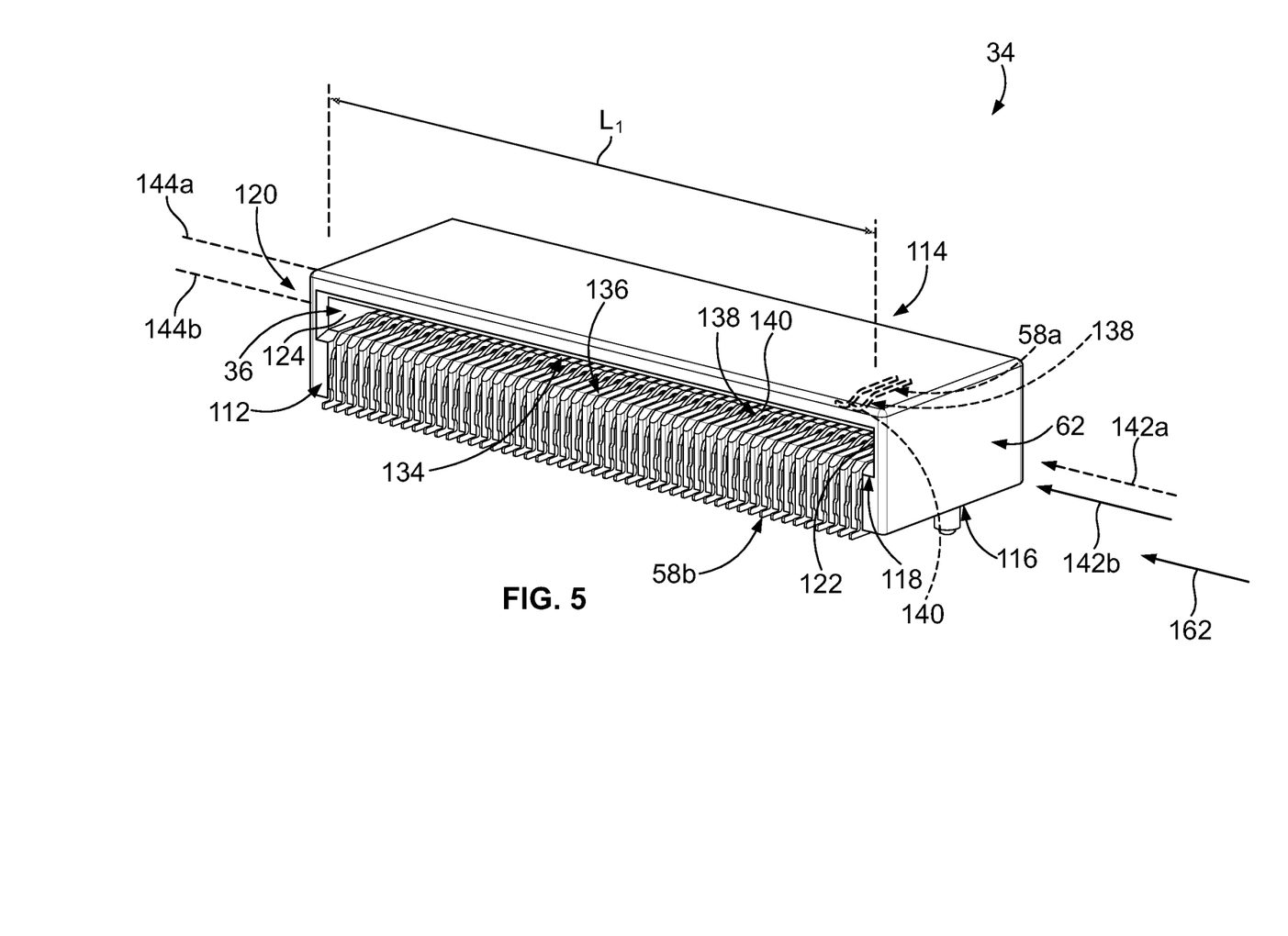
FIG. 5 is a perspective view of an exemplary embodiment of a receptacle connector of the transceiver assembly shown in FIG. 1.

FIG. 5 is a perspective view of an exemplary embodiment of the receptacle connector 34. The receptacle connector 34 includes the connector body 62, which extends from a front end 112 to a rear end 114 and includes a bottom side 116. The connector body 62 is configured to be mounted on the host circuit board 16 (FIGS. 1 and 2) at the bottom side 116. The front end 112 of the connector body 62 includes the receptacle 36. More particularly, the receptacle 36 extends through the front end 112 and into the connector body 62 toward the rear end 114. The receptacle 36 extends a length $L_1$ from an end 118 to an opposite end 120. The ends 118 and 120 include respective end surfaces 122 and 124. The receptacle 36 includes opposing sides 134 and 136. As described above, the receptacle 36 is configured to receive the plug 56 (FIGS. 2, 4, and 6-10) of the pluggable module 12 (FIGS. 1, 2, 4, 6, 7, and 8) therein. The ends 118 and 120 may each be referred to as a "receptacle end". The receptacle connector 34 may be referred to herein as an "electrical connector".

The electrical contacts 58a and 58b of the receptacle connector 34 are held by the connector body 62. The electrical contacts 58a and 58b include mating segments 138 having mating interfaces 140 that are exposed within the receptacle 36. The electrical contacts 58a and 58b engage the corresponding electrical contacts 54a and 54b (FIGS. 2, 4, and 8-10), respectively, of the straddle mount connector 32 (FIGS. 2, 4, and 6) at the mating interfaces 140 to establish an electrical connection between the connectors 32 and 34. The mating segments 138 of the electrical contacts 58a and 58b are arranged in respective rows 142a and 142b that extend lengths along the sides 134 and 136, respectively, of the receptacle 36. The rows 142a and 142b extend the lengths along respective row axes 144a and 144b. The electrical contacts 58a are indicated with phantom lines in FIG. 5. Only some of the electrical contacts 58a in the row 142a are shown in FIG. 5 for clarity. Optionally, the electrical contacts 58a and 58b are arranged such that the mating segment 138 of one or more electrical contacts 58a on the side 134 of the receptacle 36 is aligned with the mating segment 138 of a corresponding electrical contact 58b on the side 136 of the receptacle 36.

The electrical contacts 58a and 58b may include signal contacts that are configured to conduct electrical data signals, ground contacts that are configured to be electrically connected to a ground, and/or power contacts that are configured to conduct electrical power. The receptacle connector 34 may include any number of the electrical contacts 58a and any number of the electrical contacts 58b. Optionally, some or all electrical contacts 58a and/or 58b used as signal contacts may be arranged in pairs with each signal contact within a pair conveying a differential signal, thus defining one or more differential pairs. Within the arrangement of the electrical contacts 58a and 58b, one or more ground contacts may be provided between adjacent differential pairs of signal contacts. Any other contact arrangement of the electrical contacts 58a and 58b may be provided. The electrical contacts 58a and 58b may be referred to herein as "mating contacts" and/or "contacts".

Figure 6:
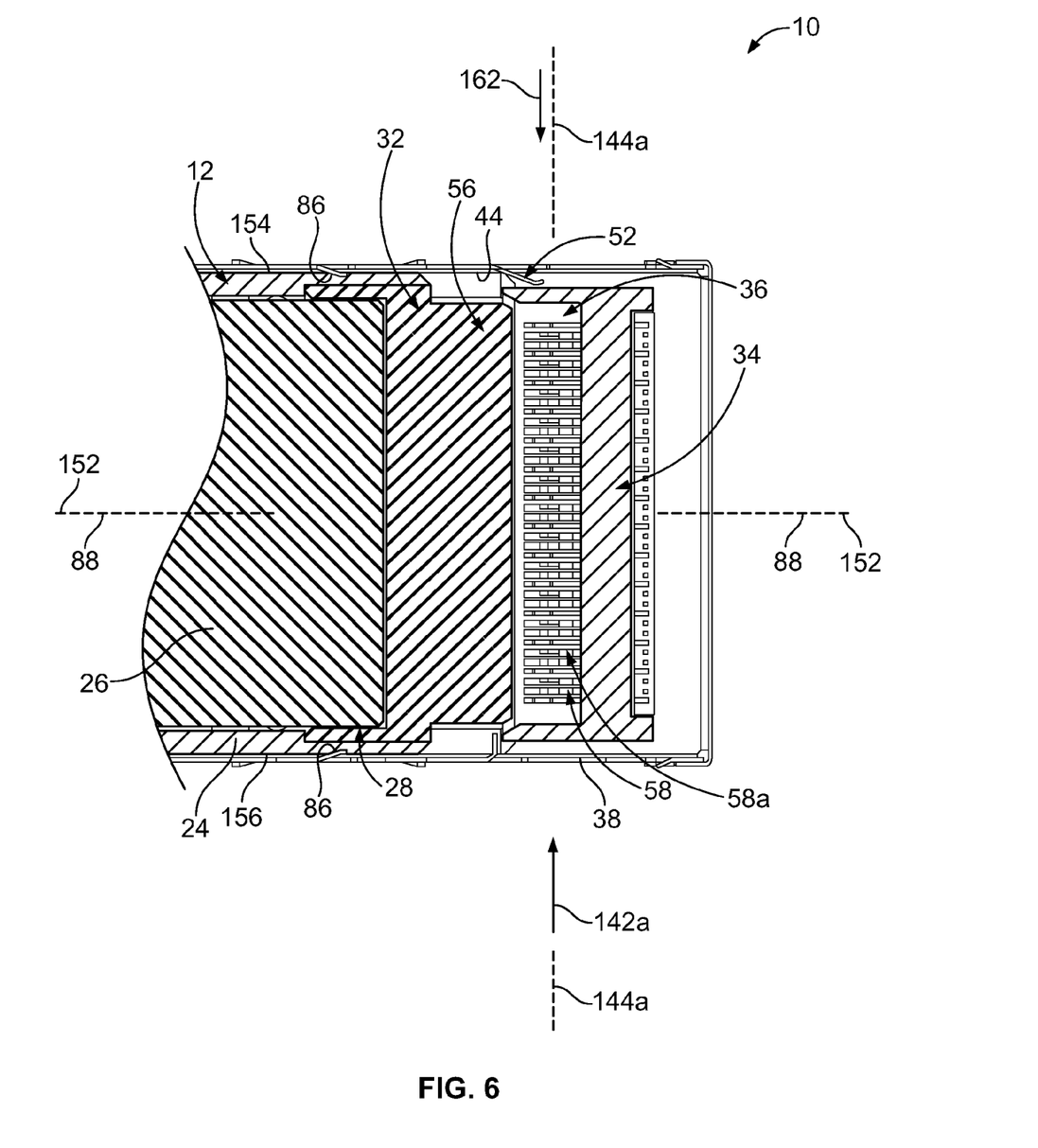
FIG. 6 is a cross-sectional view of a portion of the transceiver assembly shown in FIGS. 1 and 2 taken along line 6-6 of FIG. 1.

FIG. 6 is a cross-sectional view of a portion of the transceiver assembly 10 taken along line 6-6 of FIG. 1. The pluggable module 12 is configured to be inserted into the internal compartment 44 of the cage 38 along an insertion axis 152. Optionally, the centering springs 86 engage opposite side walls 154 and 156 of the housing 24 of the pluggable module 12 to facilitate centering the pluggable module 12 along the central longitudinal axis 88 of the cage 38. Referring again to FIG. 1, the front sides 94 and 96 of the stops 90 and 92, respectively, of the cage 38 engage respective end surfaces 158 and 160 of the housing 24 of the pluggable module 12 to facilitate limiting the amount of travel of the pluggable module 12 along the length of the cage 38 as the module 12 is inserted into the internal compartment 44 and mated with the receptacle connector 36.

Referring again to FIG. 6, as the pluggable module 12 is received within the internal compartment 44 of the cage 38, the alignment spring 52 engages the pluggable module 12. As the alignment spring 52 engages the pluggable module 12, the alignment spring 52 resiliently deflects from the natural resting position thereof such that the alignment spring 52 exerts the biasing force on the pluggable module 12, which biases the pluggable module 12 in an alignment direction 162. As will be described below, biasing the pluggable module 12 in the alignment direction 162 aligns the electrical contacts 54 (FIGS. 2, 4, and 8-10) of the plug 56 with the corresponding electrical contacts 58 of the receptacle connector 34. More specifically, biasing the pluggable module 12 in the alignment direction 162 aligns the electrical contacts 54a in the row 102a (FIGS. 4 and 9) of the plug 56, along the row axes 104a (FIG. 4) and 144a, with the corresponding electrical contacts 58a in the row 142a of the receptacle connector 34. Moreover, biasing the pluggable module 12 in the alignment direction 162 aligns the electrical contacts 54b in the row 102b (FIGS. 4 and 10) of the plug 56, along the row axes 104b (FIG. 4) and 144b (FIG. 5), with the corresponding electrical contacts 58b in the row 142b (FIGS. 5 and 10) of the receptacle connector 34.

As should be apparent from a comparison of FIGS. 4-6, the alignment direction 162 extends along the lengths of the rows 102a, 102b, 142a, and 142b of the electrical contacts 54a, 54b, 58a, and 58b, respectively. In an exemplary embodiment, the alignment direction 162 extends approximately parallel to the row axes 104a, 104b, 144a, and 144b. But, the alignment direction 162 may extend at any non-perpendicular angle relative to the row axes 104a, 104b, 144a, and 144b. Moreover, the alignment direction 162 extends approximately perpendicular to the insertion axis 152 in an exemplary embodiment. However, the alignment direction 162 may extend at any non-parallel angle relative to the insertion axis 152.

As described above, in some alternative embodiments, the edge 28 of the circuit board 26 defines the plug 56 of the pluggable module 12, such that the receptacle 36 receives the edge 28 of the circuit board 26 therein and the contact pads 68a and 68b (FIG. 4) of the circuit board 26 engage corresponding electrical contacts 58a and 58b, respectively, of the receptacle connector 34. In such alternative embodiments, biasing the pluggable module 12 in the alignment direction 162 aligns the contact pads 68a and 68b of the circuit board 26 in the rows 146a and 146b, respectively, (along the row axes 148a and 148b (FIG. 4), respectively, and 144a and 144b, respectively) with the corresponding electrical contacts 58a and 58b in the rows 142a and 142b, respectively, of the receptacle connector 34.

Figure 7:
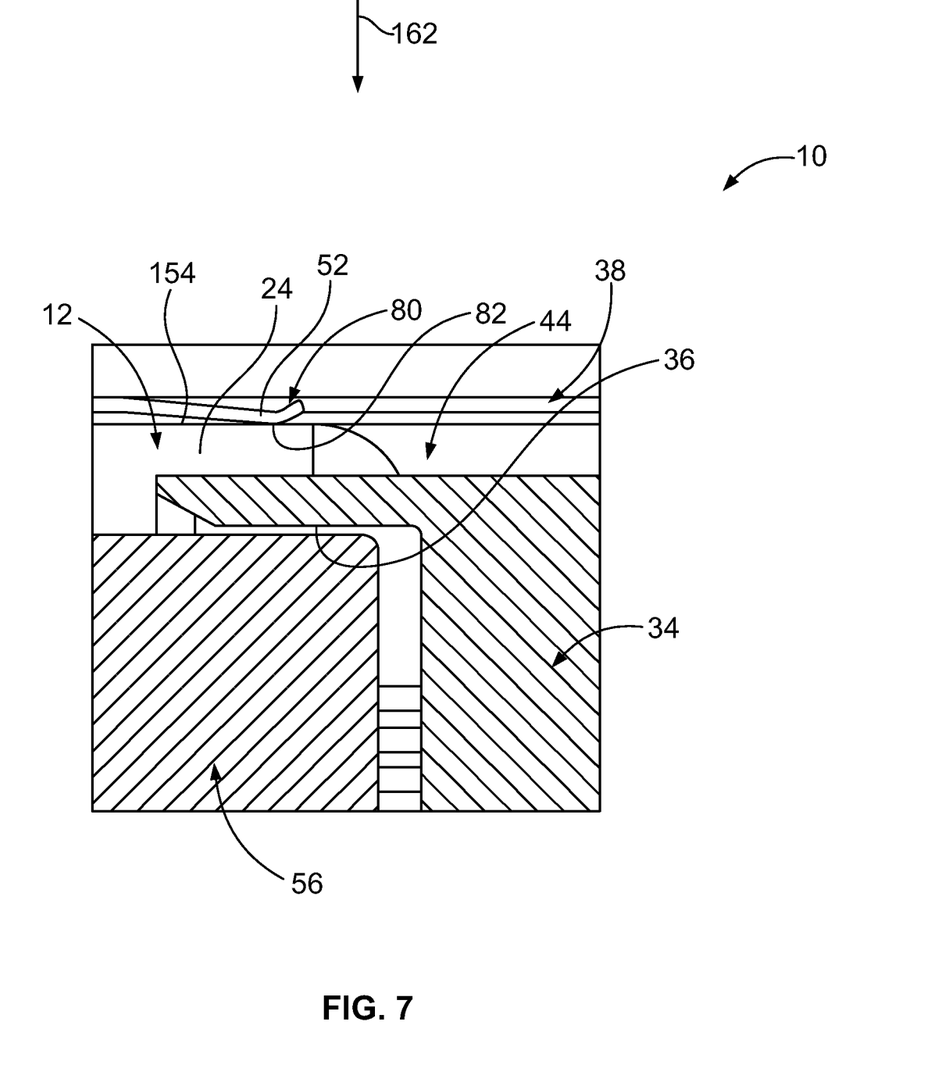
FIG. 7 is an enlarged cross-sectional view of a portion of the transceiver assembly shown in FIGS. 1 and 2.

FIG. 7 is an enlarged cross-sectional view of a portion of the transceiver assembly 10 illustrating engagement of the alignment spring 52 with the pluggable module 12. In an exemplary embodiment, the alignment spring 52 engages the side wall 154 of the housing 24 of the pluggable module 12. The alignment spring 52 rides along the side wall 154 of the module 12 as the plug 56 of the pluggable module 12 is inserted into the receptacle 36 of the receptacle connector 34. The alignment spring 52 may engage the side wall 154 of the pluggable module housing 24 at any locations along the length thereof to bias the pluggable module 12 in the alignment direction 162. In some alternative embodiments, the alignment spring 52 engages the side wall 156 of the pluggable module housing 24. Moreover, in some alternative embodiments, the cage 38 includes an alignment spring 52 that engages the side wall 154 of the housing 24 of the pluggable module 12 and another alignment spring 52 that engages the side wall 156.

The module interface 82 at the end 80 of the alignment spring 52 engages the side wall 154 of the housing 24 of the pluggable module 12 to bias the pluggable module in the alignment direction 162. Optionally, and as should be apparent from a comparison of FIGS. 4-7, the alignment spring 52 is positioned along the length of the cage 38 such that the alignment spring 52 engages the pluggable module 12 at a location along the length of the cage 38 wherein the electrical contacts 54 and 58 of the plug 56 and receptacle connector 58, respectively, mate together. For example, the alignment spring 52 may be positioned along the length of the cage 38 such that the alignment spring 52 engages the pluggable module 12 at a location along the length of the cage 38 that is aligned with the row axes 104a, 104b, 144a, and/or 144b when the electrical contacts 54 and 58 are mated together.

Figure 8:
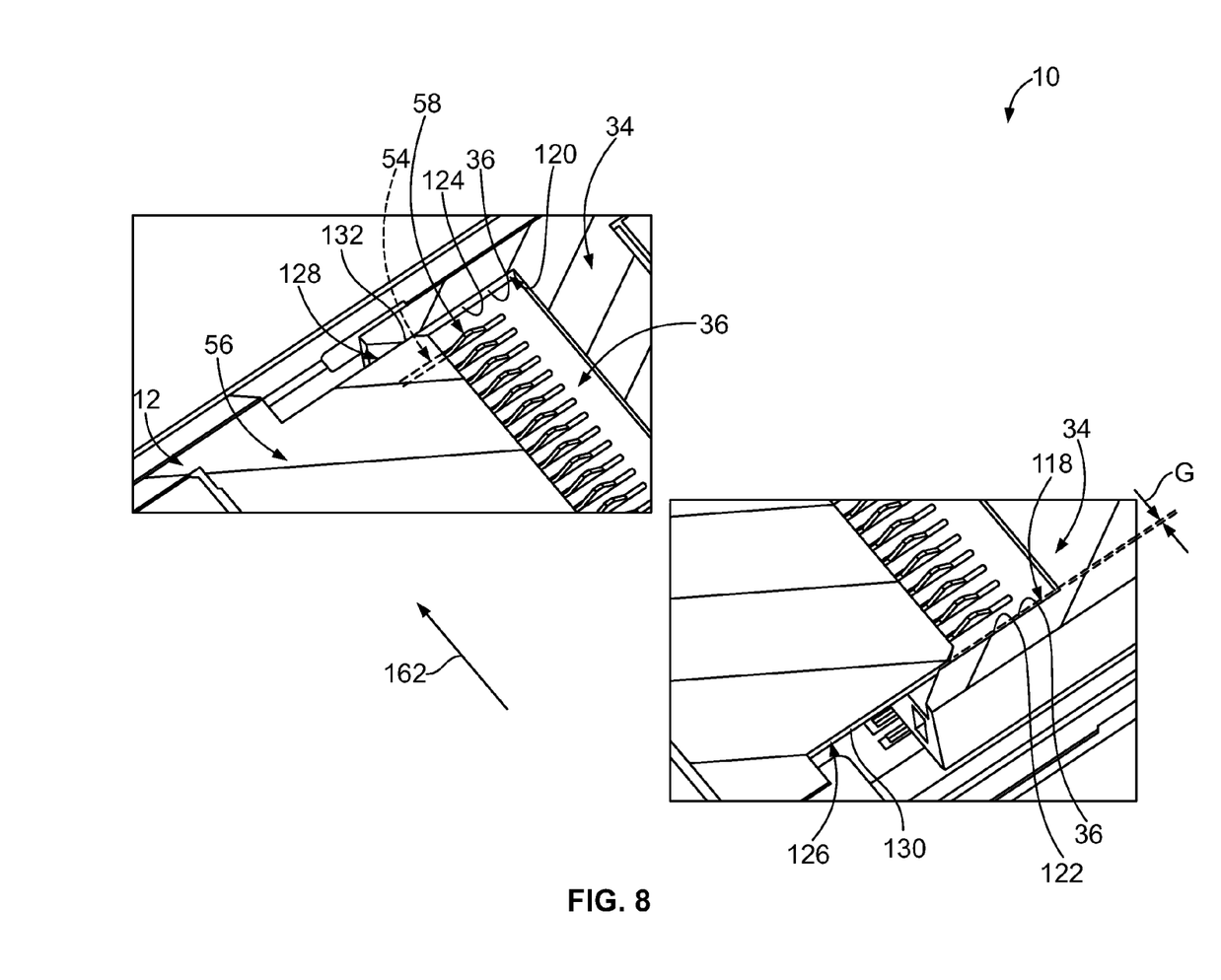
FIG. 8 is an enlarged perspective view of a cross section of a portion of the transceiver assembly shown in FIGS. 1 and 2.

FIG. 8 is an enlarged perspective view of a cross section of a portion of the transceiver assembly 10 illustrating an exemplary embodiment of an aligned position of the plug 56 relative to the receptacle 36. FIG. 8 illustrates the plug 56 of the pluggable module 12 partially received within the receptacle 36 of the receptacle connector 34. FIG. 8 is viewed from the opposite angle to FIG. 6. The biasing of the pluggable module 12 in the alignment direction 162 by the alignment spring 52 (FIGS. 1, 3, 6, and 7) moves the plug 56 of the pluggable module 12 into the aligned position as the module 12 is inserted into the internal compartment 44 of the cage 38. The electrical contacts 54 are positioned on the plug 56 such that when the plug 56 is in the aligned position shown in FIG. 8, the electrical contacts 54 of the plug 56 are aligned with the corresponding electrical contacts 58 of the receptacle connector 34. Only one of the electrical contacts 54 is shown (with phantom lines) in FIG. 8 for clarity.

In an exemplary embodiment, when the plug 56 is in the aligned position relative to the receptacle 36, the end surface 132 of the end 128 of the plug 56 is engaged with the end surface 124 of the end 120 of the receptacle 36, while the end surface 130 of the end 126 of the plug 56 is spaced apart from the end surface 122 of the end 118 of the receptacle 36. The end surface 130 of the plug 56 is spaced apart from the end surface 122 of the receptacle 36 by a gap G of any amount. In some alternative embodiments, when the plug 56 is in the aligned position, the end surface 130 of the end 126 of the plug 56 is engaged with the end surface 122 of the end 118 of the receptacle 36, such that the end surface 132 is spaced apart from the end surface 124 by a gap. In still other embodiments, both the end surfaces 130 and 132 are spaced apart from the respective end surface 122 and 124 when the plug 56 is in the aligned position.

Figure 9:
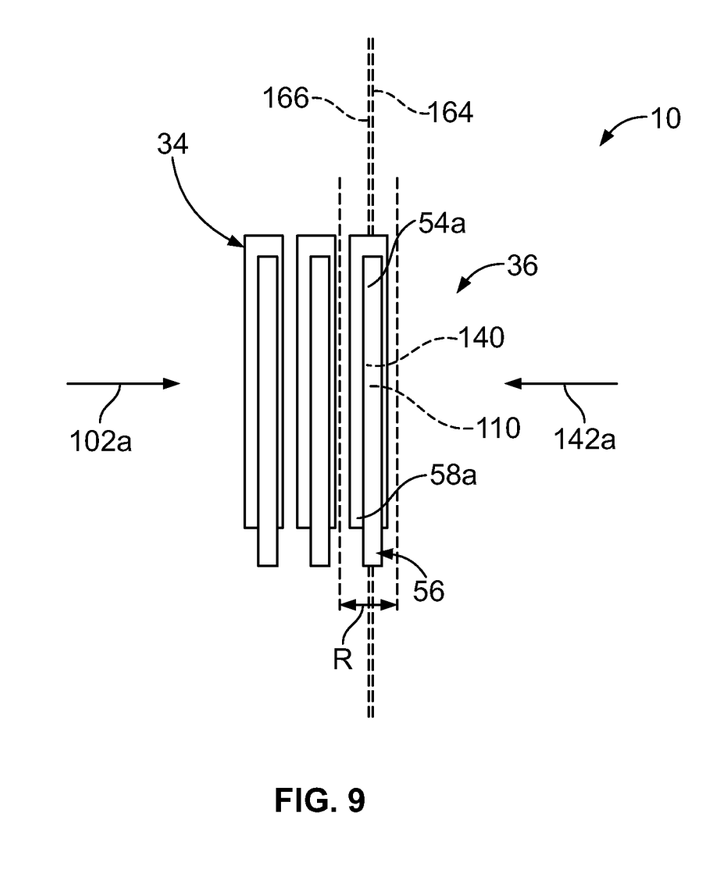
FIG. 9 is a plan view of a portion of the transceiver assembly shown in FIGS. 1 and 2.

FIG. 9 is a plan view of a portion of the transceiver assembly 10 illustrating a portion of the row 102a of the electrical contacts 54a of the plug 56 mated with the corresponding electrical contacts 58a in the row 142a of the receptacle connector 34. Only some of the electrical contacts 54a and only some of the electrical contacts 58a are shown in FIG. 9. FIG. 9 illustrates an exemplary embodiment of the alignment of the electrical contacts 54a with the corresponding electrical contacts 58a when the plug 56 is in the aligned position (FIG. 8) relative to the receptacle 36.

When the plug 56 is in the aligned position relative to the receptacle 36, the mating interfaces 110 of the electrical contacts 54a are aligned with the mating interfaces 140 of the corresponding electrical contacts 58a within a predetermine range R. More specifically, central longitudinal axes 164 and 166 of the mating segments 108 and 138 of the electrical contacts 54a and 58a, respectively, are aligned within the predetermined range R. The axes 164 and 166 are considered to be "aligned" as long as both axes 164 and 166 extend within the range R, whether or not the axes 164 and 166 are coincident. The predetermined range R may be any range that enables each electrical contact 54a to establish an adequate and reliable electrical connection to the corresponding electrical contact 58a without engaging an electrical contact 58a that does not correspond thereto (e.g., an electrical contact 58a that is adjacent the corresponding electrical contact 58a within the row 142a).

Figure 10:
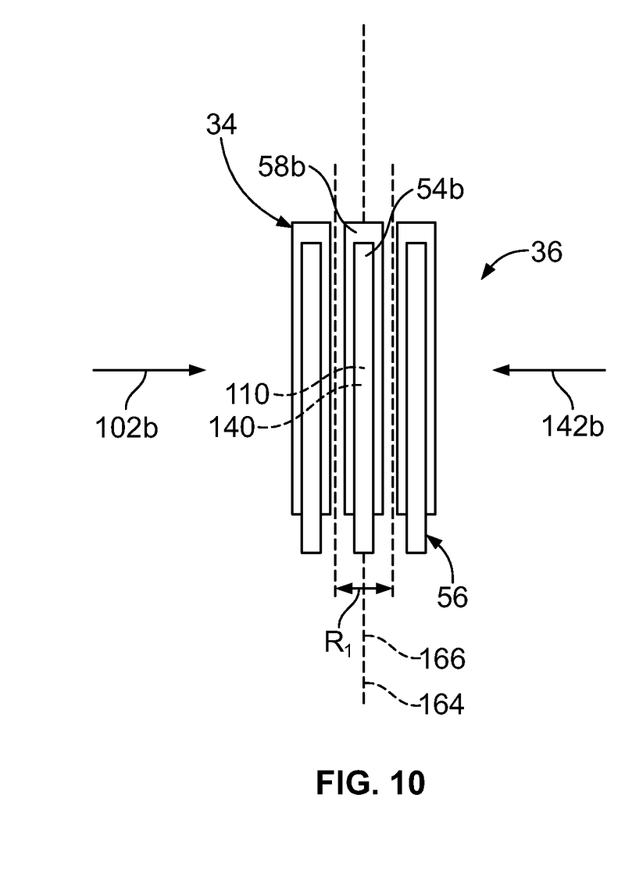
FIG. 10 is another plan view of a portion of the transceiver assembly shown in FIGS. 1 and 2 viewed from an opposite angle than FIG. 9.

FIG. 10 is a plan view of a portion of the transceiver assembly 10 illustrating the row 102b of the electrical contacts 54b of the plug 56 mated with the corresponding electrical contacts 58b in the row 142b of the receptacle connector 34. Only some of the electrical contacts 54a and only some of the electrical contacts 58a are shown in FIG. 9. FIG. 10 illustrates an exemplary embodiment of the alignment of the electrical contacts 54b with the corresponding electrical contacts 58b when the plug 56 is in the aligned position (FIG. 8) relative to the receptacle 36.

When the plug 56 is in the aligned position relative to the receptacle 36, the mating interfaces 110 of the electrical contacts 54b are aligned with the mating interfaces 140 of the corresponding electrical contacts 58b within a predetermine range $R_1$. More specifically, central longitudinal axes 164 and 166 of the mating segments 108 and 138 of the electrical contacts 54b and 58b, respectively, are aligned within the predetermined range $R_1$. In an exemplary embodiment, and as can be seen in FIG. 10, the axes 164 and 166 are coincident, but the axes 164 and 166 are considered to be "aligned" as long as both axes 164 and 166 extend within the range $R_1$. The predetermined range $R_1$ may be any range that enables each electrical contact 54b to establish an adequate and reliable electrical connection to the corresponding electrical contact 58b without engaging an electrical contact 58b that does not correspond thereto (e.g., an electrical contact 58b that is adjacent the corresponding electrical contact 58b within the row 142b).

The embodiments described and/or illustrated herein may provide a transceiver assembly that is less likely to experience misalignment between electrical contacts of a plug of a pluggable module of the transceiver assembly and electrical contacts of a receptacle connector of the transceiver assembly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A receptacle assembly for a pluggable module, the receptacle assembly comprising:
   a cage having an internal compartment and a front end that is open to the internal compartment, the internal compartment being configured to receive the pluggable module therein through the front end, the cage comprising an alignment spring extending into the internal compartment; and
   an electrical connector positioned within the internal compartment of the cage, the electrical connector being configured to mate with the pluggable module to electrically connect the electrical connector to the pluggable module, the electrical connector comprising a receptacle that receives a plug of the pluggable module therein, the receptacle extending a length from a first receptacle end to an opposite second receptacle end, wherein the alignment spring of the cage is configured to bias the pluggable module in an alignment direction as the pluggable module is received within the internal compartment such that a first plug end of the plug is engaged in physical contact with an end surface of the first receptacle end of the receptacle and such that a second plug end of the plug that is opposite the first plug end is spaced apart from an end surface of the second receptacle end of the receptacle by a gap.

2. The assembly of claim 1, wherein the electrical connector comprises contacts that are configured to mate with mating contacts of the plug of the pluggable module, the contacts of the electrical connector being arranged in a row that extends a length along a row axis, the alignment direction extending along the length of the row of contacts.

3. The assembly of claim 1, wherein the pluggable module is configured to be inserted into the internal compartment of the cage along an insertion axis, the alignment direction extending non-parallel to the insertion axis.

4. The assembly of claim 1, wherein the electrical connector comprises contacts that are configured to mate with mating contacts of the plug of the pluggable module, the alignment spring biasing the pluggable module such that the mating contacts of the plug are aligned with the corresponding contacts of the electrical connector as the pluggable module is received within the internal compartment of the cage.

5. The assembly of claim 1, wherein the electrical connector comprises contacts that are configured to mate with mating contacts of the plug of the pluggable module, the contacts of the electrical connector being arranged in a row that extends a length along a row axis, the alignment spring biasing the pluggable module such that the mating contacts of the plug are aligned along the row axis with the corresponding contacts of the electrical connector as the pluggable module is received within the internal compartment of the cage.

6. The assembly of claim 1, wherein the pluggable module is configured to be inserted into the internal compartment of the cage along an insertion axis, the alignment direction extending approximately perpendicular to the insertion axis.

7. The assembly of claim 1, wherein the cage comprises a stop extending within the internal compartment, the stop being configured to engage the pluggable module to limit travel of the pluggable module within the internal compartment.

8. The assembly of claim 1, wherein the cage comprises an upper wall, a lower wall, and side walls extending from the upper wall to the lower wall, the lower wall comprising an opening that enables the electrical connector to be mounted to an electrical component, the alignment spring extending outwardly from one of the side walls into the internal compartment.

9. The assembly of claim 1, wherein the electrical connector comprises contacts that are configured to mate with mating contacts of the plug of the pluggable module, the plug comprising one of:
    an edge of a circuit board of the pluggable module, wherein the mating contacts of the plug comprise contact pads arranged along the edge of the circuit board; or
    an extension of a straddle mount connector that is mounted to an edge of a circuit board of the pluggable module.

10. The assembly of claim 1, wherein the cage extends a length from the front end to a rear end, the alignment spring being positioned along the length of the cage at a location along the length of the cage that is approximately aligned with the electrical connector.

11. A transceiver assembly comprising:
    a pluggable module comprising a plug having contacts; and
    a receptacle assembly comprising:
    a cage having an internal compartment and a front end that is open to the internal compartment, the internal compartment being configured to receive the pluggable module therein through the front end, the cage comprising an alignment spring extending into the internal compartment and a pair of opposing latch springs extending into the internal compartment, the latch springs being configured to be received in corresponding latch cavities of the pluggable module; and
    an electrical connector positioned within the internal compartment of the cage, the electrical connector comprising mating contacts that are configured to mate with the contacts of the plug of the pluggable module to electrically connect the electrical connector to the pluggable module, the mating contacts of the electrical connector being arranged in a row that extends a length along a row axis, wherein the alignment spring of the cage is configured to engage the pluggable module as the pluggable module is received within the internal compartment of the cage such that the alignment spring biases the pluggable module in an alignment direction as the pluggable module is received within the internal compartment, the alignment direction extending approximately parallel to the row axis.

12. The assembly of claim 11, wherein the alignment spring biases the pluggable module such that the contacts of the plug are aligned with the corresponding mating contacts of the electrical connector as the pluggable module is received within the internal compartment of the cage.

13. The assembly of claim 11, wherein the alignment spring is configured to engage a side wall of a housing of the pluggable module as the pluggable module is received within the internal compartment of the cage.

14. The assembly of claim 11, wherein the cage extends a length from the front end to a rear end, the alignment spring being positioned along the length of the cage at a location along the length of the cage where contacts of the electrical connector mate with mating contacts of the pluggable module.

15. The assembly of claim 11, wherein the alignment spring is not received within any latch cavities of the pluggable module when the pluggable module is fully received within the internal compartment of the cage.

16. A receptacle assembly for a pluggable module, the receptacle assembly comprising:
    a cage having an internal compartment and a front end that is open to the internal compartment, the internal compartment being configured to receive the pluggable module therein through the front end, the cage extending a length from the front end to a rear end, the cage comprising an alignment spring extending into the internal compartment, wherein the alignment spring is positioned closer to the rear end than the front end along the length of the cage; and
    an electrical connector positioned within the internal compartment of the cage, the electrical connector being configured to mate with the pluggable module to electrically connect the electrical connector to the pluggable module, wherein the alignment spring of the cage is configured to bias the pluggable module in an alignment direction as the pluggable module is received within the internal compartment, wherein the alignment spring is positioned along the length of the cage at a location along the length of the cage where contacts of the electrical connector mate with mating contacts of the pluggable module.

17. The assembly of claim 16, wherein the contacts of the electrical connector are arranged in a row that extends a length along a row axis, the location of the alignment spring along the length of the cage being approximately aligned with the row axis.

* * * * *